(12) United States Patent
Shigihara et al.

(10) Patent No.: US 11,787,197 B2
(45) Date of Patent: Oct. 17, 2023

(54) IMAGE FORMING APPARATUS AND MEASUREMENT APPARATUS

(71) Applicant: CANON KABUSHIKI KAISHA, Tokyo (JP)

(72) Inventors: Keita Shigihara, Chiba (JP); Kenichi Hirota, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/676,947

(22) Filed: Feb. 22, 2022

(65) Prior Publication Data
US 2022/0281227 A1  Sep. 8, 2022

(30) Foreign Application Priority Data
Mar. 8, 2021  (JP) ................. 2021-036277

(51) Int. Cl.
*B41J 2/21* (2006.01)
*B41J 11/42* (2006.01)

(52) U.S. Cl.
CPC ............. *B41J 2/2103* (2013.01); *B41J 11/42* (2013.01)

(58) Field of Classification Search
CPC ................................ B41J 2/2103; B41J 11/42
See application file for complete search history.

(56) References Cited

U.S. PATENT DOCUMENTS

| 9,213,293 B2 | 12/2015 | Tajima et al. |
| 2013/0162998 A1* | 6/2013 | Furuta ................. B41J 2/04558 356/402 |
| 2014/0185047 A1 | 7/2014 | Tajima et al. |

FOREIGN PATENT DOCUMENTS

| JP | 2005-221582 A | 8/2005 |
| JP | 2013-054324 A | 3/2013 |
| JP | 2014-131205 A | 7/2014 |

* cited by examiner

*Primary Examiner* — Justin Seo
(74) *Attorney, Agent, or Firm* — Venable LLP

(57) ABSTRACT

An image forming apparatus includes an image forming unit, a conveyance guide having an opening portion, a measurement unit including a light entrance portion, and a moving member including a reference portion. The measuring unit is configured to measure an image on a sheet through the opening portion in a first state where the measurement unit is positioned in a first position and the moving member is positioned in a third position. The measurement unit is configured to measure the reference portion in a second state where the measurement unit is positioned in a second position and the moving member is positioned in a fourth position.

16 Claims, 10 Drawing Sheets

FIG. 4

Header

```
size:            270176 bytes
CMMYType:        'appl'
version:         0x02002001
profileClose:    'Drtr'
dataColorSpace:  'CMYK'
interchangeSpace: 'XYZ'
CreationDate:    3.4.1996, 19:16:14
CS23ignature:    'acsp' prim.platform:      'APPL'
flags:              0x00000000
deviceManufacturer: 'EF1'
deviceModel:        0
deviceAttributes:   0x00000000, 0x00000000
renderingIntent:    2
white XYZ:          X = 0.9642, Y = 1.0000, Z = 0.8249

<10 elements, double-click to inspect>
```

Tag Table

| Ind | Signet. | elementoffset | size |
|---|---|---|---|
| 0 | 'A2B0' | 252 = 0x000000FC | 43002 |
| 1 | 'B2A0' | 43256 = 0x0000A8F8 | 42940 |
| 2 | 'A2B1' | 86196 = 0x00015084 | 43002 |
| 3 | 'B2A1' | 129200 = 0x0001F880 | 42940 |
| 4 | 'A2B2' | 172140 = 0x0002A06C | 43002 |
| 5 | 'B2A2' | 215144 = 0x00034868 | 42940 |
| 6 | 'gamt' | 258084 = 0x0003F024 | 11925 |
| 7 | 'desc' | 270012 = 0x00041EBC | 125 |
| 8 | 'cprt' | 270140 = 0x00041F3C | 14 |
| 9 | 'wtpt' | 270156 = 0x00041F3C | 20 |

IMAGE FORMING APPARATUS AND MEASUREMENT APPARATUS

BACKGROUND OF THE INVENTION

Field of the Invention

The present disclosure relates to an image forming apparatus forming an image on a sheet, and a measurement apparatus measuring the image on the sheet.

Description of the Related Art

For an image forming apparatus used for on-demand printing, the maintenance of high image quality is required. Graininess, uniformity within image area, character quality, color reproducibility (including color stability), and geometrical characteristics (including double-sides registration) are included as indexes of the image quality. Further, since an operation rate of the image forming apparatus is decreased if it takes a long time to adjust and confirm the image quality, an image forming apparatus capable of outputting a test image and automatically adjusting image forming conditions is required.

Japanese Patent Application Laid-open Nos. 2005-221582 and 2013-054324 disclose automatic adjustments of the image forming conditions by measuring a color and position of the test image (discrimination indicator of a color chart and an image position) formed on the sheet with an optical measuring unit. Japanese Patent Application Laid-open No. 2014-131205 discloses as follows: a color sensor is disposed on one side of a conveyance path, a white reference plate facing the color sensor is disposed on the other side of the conveyance path, and a measurement result of the test image by the color sensor is adjusted based on a measurement result of the white reference plate. Further, Japanese Patent Application Laid-open No. 2014-131205 discloses that, so as to prevent discoloration of and the adherence of a foreign substance to the white reference plate, the white reference plate is covered by a shutter member in a case where the reading of the white reference plate is not performed.

However, by a configuration disclosed by Japanese Patent Application Laid-open No. 2014-131205, it is necessary to dispose a shutter for the color sensor and a shutter for the white reference plate separately, so that the apparatus is increased in size.

SUMMARY OF THE INVENTION

The present disclosure provides an image forming apparatus and a measurement apparatus that can attenuate degradation of measurement accuracy with a compact configuration.

According to one aspect of the invention, an image forming apparatus includes an image forming unit configured to form an image on a sheet, a conveyance guide configured to guide the sheet on which the image has been formed by the image forming unit, the conveyance guide having an opening portion, a measurement unit configured to measure the image on the sheet conveyed through a conveyance path formed by the conveyance guide, the measurement unit including a light entrance portion through which light from a measurement object enters the measurement unit, and a moving member movable with respect to the measurement unit and disposed on a same side as the measurement unit with respect to the conveyance path, the moving member including a reference portion configured to be measured by the measurement unit, wherein the measurement unit is movable to a first position and a second position along a first direction approaching and moving away from the opening portion, the first position being a position where the measurement unit faces the opening portion in the conveyance guide, the second position being a position away from the opening portion in comparison with the first position, wherein the moving member is movable to a third position and a fourth position along a second direction intersecting with the first direction, the third position being a position where the reference portion does not face the light entrance portion, the fourth position being a position where the reference portion faces the light entrance portion, wherein the measuring unit is configured to measure the image on the sheet through the opening portion in a first state where the measurement unit is positioned in the first position and the moving member is positioned in the third position, and wherein the measurement unit is configured to measure the reference portion in a second state where the measurement unit is positioned in the second position and the moving member is positioned in the fourth position.

According to another aspect of the invention, a measurement apparatus includes a conveyance guide configured to guide the sheet on which the image has been formed by an image forming unit, the conveyance guide having an opening portion, a measurement unit configured to measure the image on the sheet conveyed through a conveyance path formed by the conveyance guide, the measurement unit including a light entrance portion through which light from a measurement object enters the measurement unit, and a moving member movable with respect to the measurement unit and disposed on a same side as the measurement unit with respect to the conveyance path, the moving member including a reference portion configured to be measured by the measurement unit, wherein the measurement unit is movable to a first position and a second position along a first direction approaching and moving away from the opening portion, the first position being a position where the measurement unit faces the opening portion in the conveyance guide, the second position being a position away from the opening portion in comparison with the first position, wherein the moving member is movable to a third position and a fourth position along a second direction intersecting with the first direction, the third position being a position where the reference portion does not face the light entrance portion, the fourth position being a position where the reference portion faces the light entrance portion, wherein the measuring unit is configured to measure the image on the sheet through the opening portion in a first state where the measurement unit is positioned in the first position and the moving member is positioned in the third position, and wherein the measurement unit is configured to measure the reference portion in a second state where the measurement unit is positioned in the second position and the moving member is positioned in the fourth position.

Further features of the present invention will become apparent from the following description of exemplary embodiments with reference to the attached drawings.

BRIEF DESCRIPTION OF THE DRAWINGS

FIG. 4 illustrates a data structure of an International Color Consortium (ICC) profile.

DESCRIPTION OF THE EMBODIMENTS

Now, embodiments of this disclosure will be described with reference to the drawings.

First Embodiment

Figure 1:
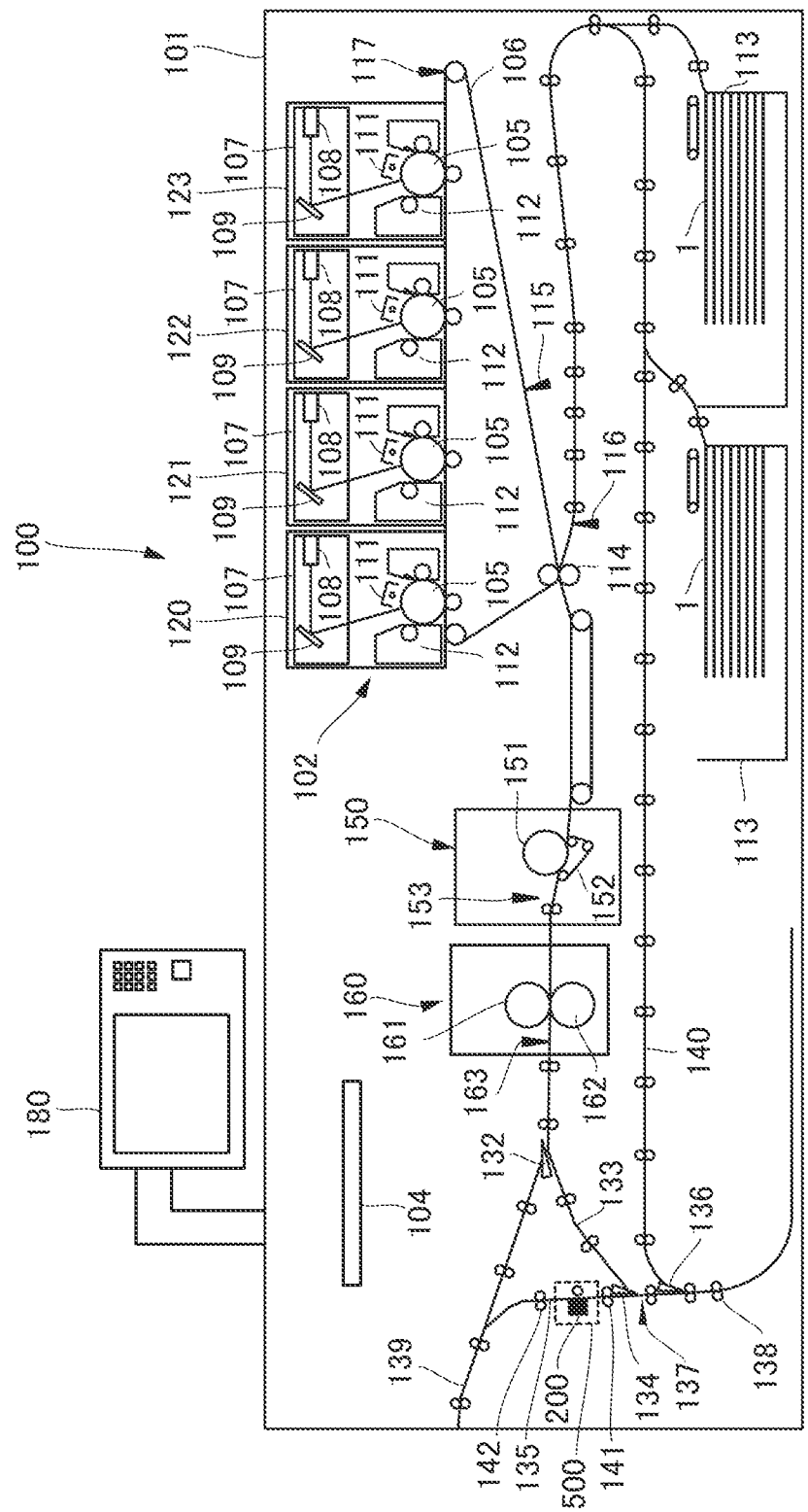
FIG. 1 is a schematic diagram illustrating a configuration of an image forming apparatus pertinent to a first embodiment of the present disclosure.

FIG. 1 is a schematic diagram illustrating an image forming apparatus 100 pertinent to a first embodiment. An image forming engine 102 and a control board storage portion 104 storing a printer controller 103, described below, controlling operations of the image forming apparatus 100 are mounted in a casing 101 of the image forming apparatus 100. The image forming engine 102, serving as an image forming unit of this embodiment, includes an optical process mechanism forming an image on a recording material by an electrophotographic process, a fixing process mechanism, and a feed process mechanism and a conveyance process mechanism feeding and conveying a sheet 1 used as the recording material. The sheet that is usable as the recording material (recording media) includes a sheet such as a standard paper, a thick paper, a surface treated sheet such as a coated sheet or an embossed sheet, and a sheet material such as a plastic film or cloth.

The optical process mechanism includes stations 120, 121, 122, and 123 forming toner images of respective colors of yellow, magenta, cyan, and black, and an intermediate transfer belt 106. In each of the stations 120 through 123, a primary charging unit 111 electrically charges a surface of a photosensitive drum 105 which is a drum-shaped image bearing member (electrophotographic photosensitive member). A laser scanner portion 107 performs an exposure process of the photosensitive drum 105 based on a command signal generated based on image data and transmitted to the laser scanner portion 107. The laser scanner portion 107 includes a laser driver driving a laser beam radiated from a semiconductor laser, not illustrated, ON and OFF, and leads the laser beam from the semiconductor laser to the photosensitive drum 105 through a reflection mirror 109 while allocating in a main scanning direction by a rotational polygonal mirror. Thereby, an electrostatic latent image corresponding to the image data is formed on the surface of the photosensitive drum 105.

A developing unit 112 stores a developing agent containing toner, and supplies charged toner particles to the photosensitive drum 105. The electrostatic latent image borne on the photosensitive drum 105 is visualized as a toner image with the toner particles adhering to the surface of the drum in accordance with a surface potential distribution. The toner image borne on the photosensitive drum 105 is transferred (primarily transferred) onto the intermediate transfer belt 106 to which the voltage of a polarity inverse to a normal electrification polarity of the toner is applied. In a case forming a color image, a full color toner image is formed on the belt by the toner images formed by the four stations 120 through 123 having been transferred in a manner overlapping each other. Meanwhile the feed process mechanism feeds the sheet 1 one by one from a storage cabinet 113 drawably inserted into the casing 101 of the image forming apparatus 100 toward a transfer roller 114. The toner image borne on the intermediate transfer belt 106, serving as an intermediate transfer body, is transferred (secondarily transferred) onto the sheet 1 by a transfer roller 114.

Around the intermediate transfer belt 106, an image-formation-starting-position detecting sensor 115 for determining a printing starting position at image formation, a feed timing sensor 116 for measuring a timing for feeding the sheet 1, and a concentration sensor 117 are disposed. The concentration sensor 117 measures concentration of a patch image borne on the intermediate transfer belt 106. The printer controller adjusts operating conditions for the optical process mechanism (for example, setting of a target charging potential of the primary charging unit 111 and a bias voltage of the developing unit 112) based on the detection results of the concentration sensor 117.

The fixing process mechanism of this embodiment is composed of a fixing unit 150 and a cooling unit 160. The fixing unit 150 includes a fixing roller 151 for applying heat to the sheet 1, a pressure belt 152 for bringing the sheet 1 to come into pressure contact with the fixing roller 151, and a post-fixing sensor 153 for detecting completion of the fixing process by the fixing unit 150. The fixing roller 151 is a hollow roller, and includes a heater inside. The fixing unit 150 applies heat and pressure to the toner image on the sheet 1 while nipping and conveying the sheet 1 between the fixing roller 151 and the pressure belt 152, serving as a rotary member pair. Thereby, the toner image is fixed to the sheet 1 as the toner particles melt and then adhere to the sheet 1.

The cooling unit 160 is disposed downstream of the fixing unit 150 in a conveyance route of the sheet 1. The cooling unit 160 is capable of preventing a temperature rise of the optical process mechanism by the heat radiation from the sheet 1 heated by the fixing unit 150 and suppressing a generation of a curl of the sheet 1 by the heat. The cooling unit 160 is configured to convey the sheet 1 by rollers 161 and 162 while absorbing the heat, and accelerates a heat release of the rollers 161 and 162 by a fan, not illustrated.

The sheet 1 passed through the cooling unit 160 is guided to either a first conveyance path 139 or a second conveyance path 133 by a switching flap 132. The sheet 1 guided to the first conveyance path 139 is discharged outside the image forming apparatus 100 by a sheet discharge roller pair, and stacked on a sheet discharge tray 700. A position of the sheet 1 conveyed into the second conveyance path 133 is detected by a reversal sensor 137, and then leading and trailing edges of the sheet in a sheet conveyance direction are inverted by a switchback operation performed by a reverse portion 138. Thereafter, the sheet is guided to either a third conveyance path 135 or a re-conveyance path 140 by a switching flap 136. To be noted, a guide member 134 (i.e., non-return guide) for preventing the sheet 1 guided to the third conveyance path 135 by the switching flap 136 from moving backward to the second conveyance path 133 is disposed at a branch portion of the third conveyance path 135 and the second conveyance path 133.

A colorimetric unit 500 for measuring a color of the image on the sheet is disposed along the third conveyance path 135. The colorimetric unit 500 is capable of measuring a color of the test image for measurement formed on the sheet by a color sensor 200, and a measurement result is used for operations to automatically adjust the color of the image formed by the image forming engine 102. A configuration of the color sensor 200 and an adjusting method of operating conditions of the image forming engine 102 with the color sensor 200 will be described below.

In a case of duplex printing, the sheet 1 in which an image has been formed on a first surface is conveyed again toward the transfer roller 114 through a re-conveyance path 140 in a condition where the leading and trailing edges are switched by the reverse portion 138. Thereafter, the sheet 1 in which an image has been formed on a second surface is discharged outside the image forming apparatus through the first conveyance path 139, and stacked on the sheet discharge tray 700.

System Configuration

Figure 2:
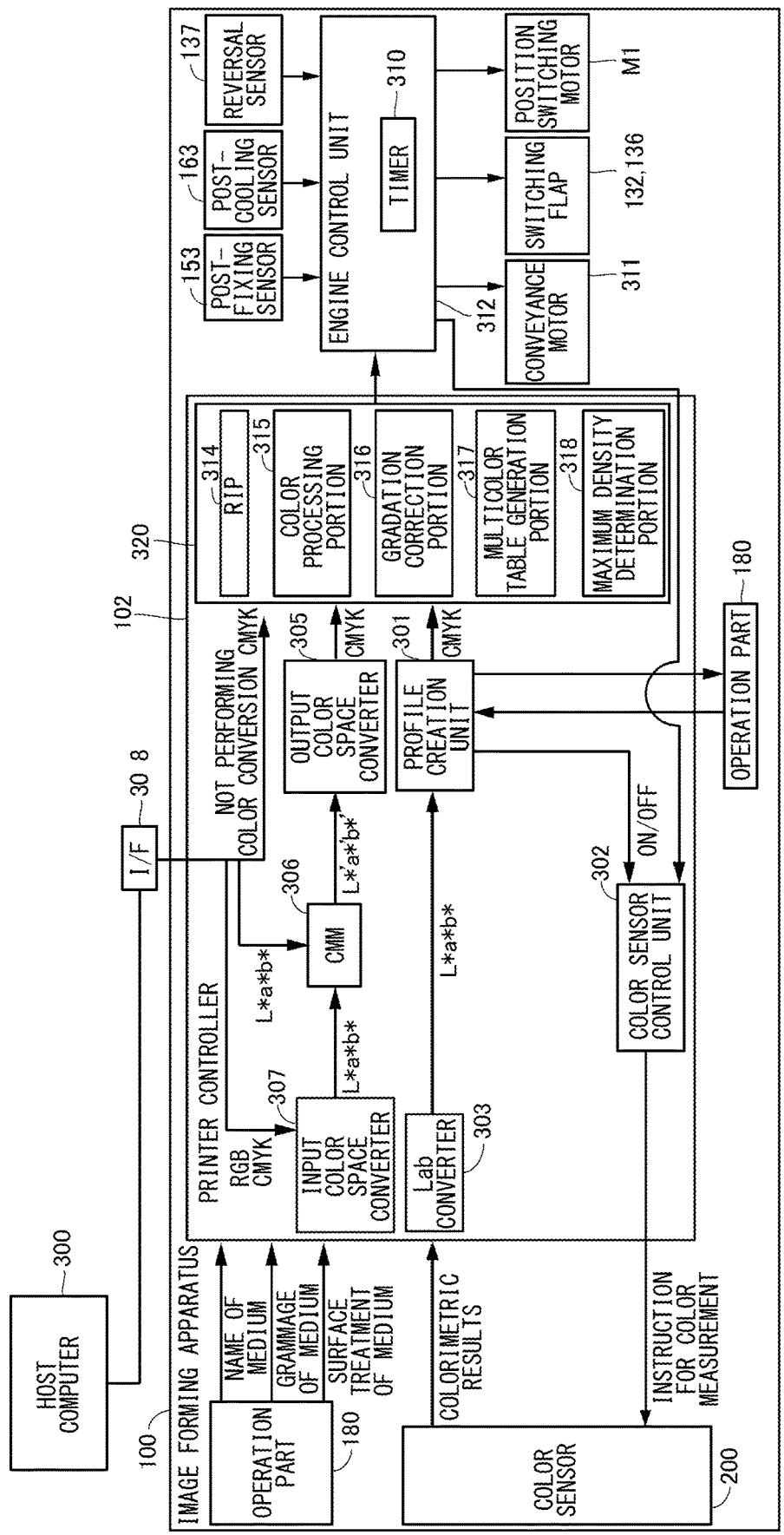
FIG. 2 is a block diagram illustrating a system configuration of the image forming apparatus pertinent to the first embodiment.

As shown in FIG. 2, the image forming apparatus 100 includes the printer controller 103 serving as a control unit integrally controlling operations of the image forming apparatus. The printer controller 103 is a control board mounting a central processing unit (CPU), serving as an executing part of programs, and a memory unit. The memory unit includes a volatile memory unit such as a random-access memory (RAM) and a nonvolatile memory unit such as a read-only memory (ROM), and serves as a storage space of programs and data and also as a work space when the CPU executes the program. The printer controller 103 also includes a functional portion for exhibiting functions described below (for example, a profile creating portion 301 and a color management module (CMM) 306. It is acceptable to mount these functional portions individually as independent hardware such as application-specific integrated circuit (ASIC), or as software as a functional module of a program executed by the CPU of the printer controller 103.

In the image forming apparatus 100, an operating part 180 serving as a user interface is disposed (see also FIG. 1). The operating part 180 includes a display serving as a display portion for presenting information for the user. Further, the operating part 180 also includes, as an input portion by which the user is able to input commands and data to the image forming apparatus 100, physical keys such as a ten-key pad and a print execute button and a touch panel function of the display. Through the operation of the operating part 180, the user is able to input information indicating attributes such as a name (name of a medium), a grammage, and the presence and absence of the surface treatment of the sheet set in a certain storage cabinet 113 into the printer controller 103. The sheet attributes thus input are registered in a sheet library stored in the memory unit.

The printer controller 103 is connected with an external wired or wireless communication network through an external interface (I/F) 308, and is communicable with a host computer 300 that is an external apparatus. The printer controller 103 is also connected with control circuits of the apparatuses constituting an image forming system by being connected with the image forming apparatus 100. An example of such apparatuses includes an image reading apparatus reading image information from a document sheet, and a sheet processing apparatus performing binding and bookbinding processes of the sheet on which the image has been formed by the image forming apparatus 100. The printer controller 103 communicates with these units, and coordinates operations of the image forming apparatus 100 and the respective apparatuses.

The printer controller 103 includes an image processing unit 320 generating the image information used for the image forming operations based on data received from the host computer 300. The image processing unit 320 includes an object generation portion 313 generating an image object based on the received data, a Raster Image Processor (RIP) 314 expanding the image object into a bit-mapped image. Further, the image processing unit 320 includes a color processing portion 315 performing a multicolor color conversion process, a gradation correction portion 316 executing the gradation correction of a monochromatic color, a multicolor table generation portion 317 generating a multicolor look up table (LUT), and a maximum density determination portion 318 setting a maximum image density. These respective elements of the image processing unit 320 are stored in the ROM as a module of a program executed by the CPU of the printer controller 103.

In a case where an execution instruction of an image formation including the image information is input into the printer controller 103, the image processing unit 320 performs the image process for color converted image information (i.e., CMYK (cyan, magenta, yellow, and black) data) using an International Color Consortium (ICC) profile, described below. Meanwhile, in a case where it is set in a setting of the image forming job that the color conversion with the ICC profile is not performed, the image processing unit 320 performs the image process for the image information (i.e., CMYK data) whose color conversion is not performed. The image information processed by the image processing unit 320 is transmitted to an engine control unit 312, and used for the image formation by the image forming engine 102.

The engine control unit 312 brings the image forming engine 102 to perform the image forming operations described above so as to form the image on the sheet based on a command signal from the printer controller 103. For instance, the engine control unit 312 controls conveyance motors 311, the switching flaps 132 and 136, and a position switching motor M1, described below, based on detection signals of a post-fixing sensor 153, a post-cooling sensor 163, and the reversal sensor 137, and a timing signal of a timer 310. The conveyance motors 311 are a motor group for driving roller members disposed at respective portions within the image forming apparatus 100, and conveys the sheet by rotating the roller members.

Color Sensor

Figure 3:
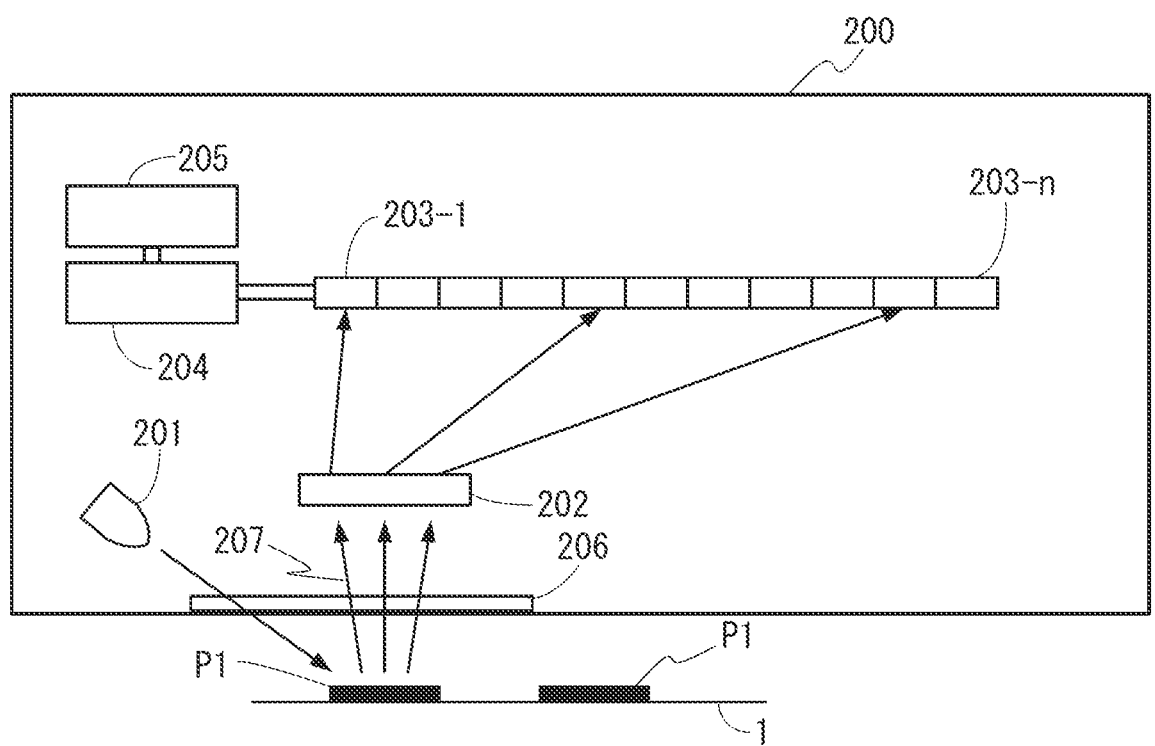
FIG. 3 is a schematic diagram illustrating a color sensor pertinent to the first embodiment.

Next, a structure of a color sensor 200 included in the image forming apparatus 100 and a color management made by using the color sensor 200 will be described. FIG. 3 is a schematic diagram illustrating the color sensor 200, serving as a measurement unit (reading unit) of this embodiment. The color sensor 200 is a sensor unit including a light emitting component 201, serving as a light source, a line sensor 203, and an optical system illuminating the sheet with the light of the light source and guiding a reflection light 207 from the sheet to the line sensor 203. The light emitting component 201 of this embodiment is constituted by a white light emitting diode (LED), and illuminates the patch image P1 on the sheet 1 with white light having a continuous spectrum. A diffraction grating 202, serving as a spectroscopic element of this embodiment, decomposes the reflection light reflected by the patch image P1 into components per wavelength of the light.

The line sensor 203 is composed of n pixels of image sensors 203-1, . . . 203-$n$, and measures intensity of the components per wavelength of the light decomposed by the diffraction grating 202. A wavelength region detectable by the line sensor 203 encompasses substantially an entire range of the visible light. For instance, so as to acquire a reflectance spectrum of the patch image P1 with a resolution of 10 nm (nanometer) over a region of 380 nm to 780 nm, it is preferred that a number of pixels are equal to or more than 41. So as to align a correspondence relation between the wavelength of the image sensors and the number of pixels, 48 or 64 are appropriate as the number of pixels. However, it is acceptable to reduce the number of pixels to less than 48 and calculate the intensity of an intermediate wavelength by an interpolation calculation method.

It is possible to utilize complementary metal oxide semiconductor (CMOS) sensors as the image sensors 203-1, . . . 203-$n$. To be noted, in the structural example in FIG. 3, a lens 206 condensing the reflection light 207 from the patch image P1 to the diffraction grating 202 is disposed. The lens 206 serves as a light entrance portion through which the light from the sheet 1, which is a measuring object, enters the color sensor 200 or a white reference portion, described below. To be noted, since the light entrance portion indicates a boundary on a side of an object in the optical system of the color sensor 200, it is acceptable that the light entrance portion is a transparent cover glass covering the color sensor 200 or an opening disposed in a casing of the color sensor 200.

A detection signal from the line sensor 203 is processed by a calculation unit 204 mounted in the color sensor 200, and a calculation result is temporarily stored in a memory 205 and then transferred to the printer controller 103. The calculation unit 204 includes, for example, a spectral calculator that performs the spectrum calculation to calculate the spectral reflectance of each patch image P1 based on light intensity values.

Color Management System

A method for managing colors by feeding back measurement results of the color sensor 200 to the image forming apparatus 100 will be described. Assume that this embodiment uses the ICC profile which is lately accepted in the market as a profile that realizes excellent color reproducibility. However, it is acceptable to adopt another color management system instead of the ICC profile.

Figure 5:
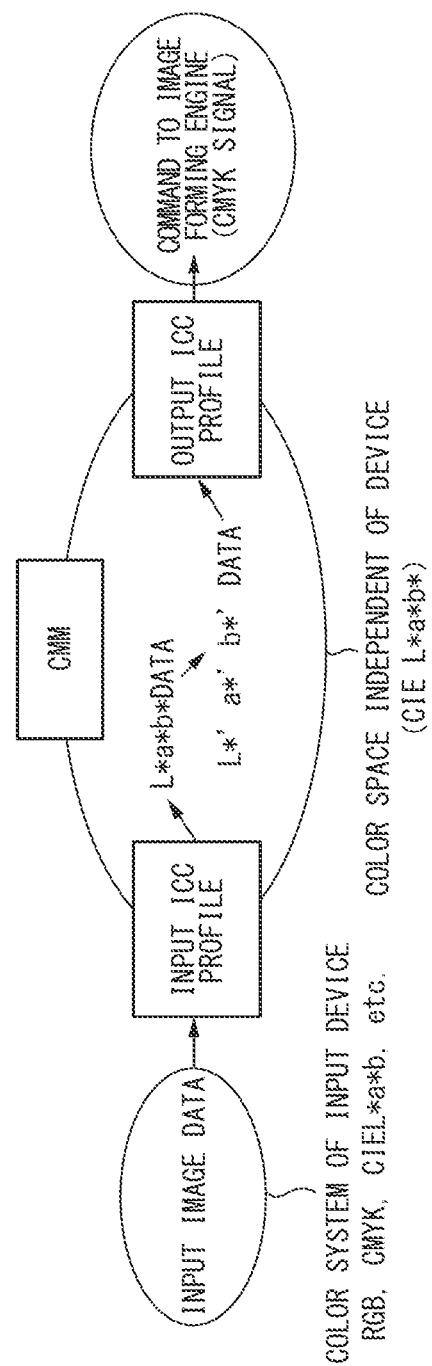
FIG. 5 is a conceptual diagram illustrating a role of a color management module.

FIG. 5 is a conceptual diagram illustrating the color management by the CMM. Image data input to the image forming apparatus 100 does not always adopt rendering of colors in an L*a*b* color space, and may be rendered by various data format (i.e., color system) such as RGB (red, green, blue), CMYK, and CIE (Commission Internationale de l'Eclairage (International Commission on Illumination)) XYZ. There is also a case where a perceived color of an original image to be reproduced by the image forming apparatus 100 is different even among image data having a common data format depending on characteristics of an input device (for example, by gamma value of a monitor and setting of color temperature).

Due to that, the CMM once converts input image data into L*a*b* data rendered by a color space independent of a device (CIE L*a*b* color space in this embodiment). Then, the CMM generates a command (CMYK signal) for causing the image forming engines to form an image from the L*'a*'b*' data obtained by executing necessary correction to the L*a*b* data. In this process, an input ICC profile is used for the conversion from the color system of the input device to the L*a*b* color space. Further, an output ICC profile is used for the conversion from the L*a*b* color space to the color space (a space of values from which the CMYK signal is able to take) handled by the image forming engine. To be noted, while the CIE L*a*b* is adopted as the device independent color space in this embodiment, it is acceptable to adopt another color space other than that (for example, CIE1931 XYZ color space).

To be noted, the CMYK signal is what designates a level of exposure caused by the laser scanner portion 107 of each of the stations 120 through 123 of yellow, magenta, cyan, and black. That is, the value of the CMYK signal corresponds to toner concentration level per every pixel of a monochromic image formed by each of the stations 120 through 123. The CMYK signal is transmitted from the printer controller 103 to the engine control unit 312, and is then input to the laser scanner portion 107 as a video signal.

Update of Profile with Color Sensor

Because the image forming apparatus 100 of this embodiment includes the color sensor 200, it is possible to prepare an own output ICC profile. The output ICC profile is a color conversion profile indicating a correspondence between the CMYK signal input to the image forming engine 102 and a color of an image actually formed on the sheet by the image forming engine 102.

In creating the output ICC profile of the image forming apparatus 100, patch images are formed on a sheet in a pattern designated in advance in the image forming apparatus 100 to make a colorimetric image pattern on the sheet at first. The sheet on which the image pattern has been formed is sent to the third conveyance path 135 to measure spectral reflectance by the color sensor 200. That is, the light irradiated from the light emitting component 201 described above and reflected by one of the patch images in the image pattern is dispersed by the diffractive grating 202, and then the line sensor 203 measures the intensity of the light components per wavelength.

Next, coordinates representing a color of each patch image in the device independent color space (the L*a*b* color space defined by CIE, here) from the spectral reflectance acquired with the color sensor 200 is calculated. It is possible, for instance, to calculate the coordinates of the L*a*b* color space from the spectral reflectance through a procedure conforming to ISO 13655 as described below.

Profile Creating Process

Next, contents of a profile creating process of creating the ICC profile by the image forming apparatus 100 will be described. It is possible to execute the profile creating process at any timing by an explicit instruction of the user through the operating part 180. For instance, it is conceivable to execute the profile creating process, in a case where a customer engineer replaces parts, before executing an image forming job by high color reproducibility is required or, further, in a case where it is desirable to know color of a final output product in a design planning stage.

When an operation for creating the ICC profile is made to the operating part 180 in FIG. 2, a signal instructing for creating the profile is input to a profile creating portion 301 of the printer controller 103. The profile creating portion 301 transmits a CMYK signal for outputting a test form (a CMYK color chart) of 928 patches provided in ISO 12642 to an engine control unit 312 without making color conversion by the output ICC profile. That is, the test form provided in ISO 12642 is adopted in this embodiment as an image pattern (a test image) for color management. In parallel with the transmission of the CMYK signal, the profile creating portion 301 sends an instruction (instruction for color measurement) to a color sensor control portion 302 to measure the test form. The color sensor control portion 302 causes the color sensor 200 to measure a color of a patch image on the test form.

The image forming apparatus 100 executes an image forming operation based on the CMYK signal input to the engine control unit 312 and forms the test form on a sheet. The sheet on which the test form has been formed is conveyed to the third conveyance path 135, and the color measurement of the test form is performed by the color sensor 200. The spectral reflectance data of each of the 928 patches measured by the color sensor 200 is notified to a Lab calculation unit 303 of the printer controller 103 to be convert into data of the L*a*b* color space.

The profile creating portion 301 creates the output ICC profile by correlating the CMYK signal transmitted to the engine control unit 312 with the colorimetric results of the color sensor 200. The profile creating portion 301 also substitutes the present output ICC profile stored in the memory with a newly created output ICC profile.

The output ICC profile is, for example, constructed as illustrated in FIG. 4, and includes a header, a tag, and its data. The profile creating portion 301 prepares a conversion table (A2Bx tag) of CMYK to L*a*b* based on the L*a*b* value obtained from the CMYK signal used in the output of the test form and the colorimetric results. Further, based on this conversion table, an inverse conversion table (B2Ax tag) of L*a*b* to CMYK is prepared. Tags representing other data such as the white color point (wtpt) and a tag (gamt) describing whether a certain color is the inside or the outside of a color range of a hard copy output by the image forming apparatus 100 are also described in the output ICC profile.

To be noted, in a case where the instruction of executing the profile creating process is input through an external I/F 308, it is acceptable to transmit the ICC profile created by the profile creating portion 301 to the external device that has sent the execution instruction. In this case, it is possible for the user to perform the color conversion on the external device by an application corresponding to the ICC profile.

To be noted, as indexes of color matching precision and color stability, ΔE is provided to be 4.0 in average in the Color Matching Precision standard (IT8.7/4(ISO 12642: 1617 patches) [4.2.2]) described in ISO 12647-7. Further, ΔE of each patch is provided to be 1.5 or less in Reproducibility [4.2.3] which is a standard of stability. So as to comply with the standards described above, ΔE of equal to or less than 1.0 is desirable as a detection precision of the color sensor 200. In the above, ΔE is a parameter expressed by the following equation and means a three-dimensional distance between two points (L1, a1, b1) and (L2, a2, b2) within the L*a*b* color space:

$$\Delta E = \{(L1-L2)^2 + (a1-a2)^2 + (b1-b2)^2\}^{(1/2)}$$

Color Conversion Process

Next, a color conversion process performed on input image data in a case where the image forming job instructing to form an image is input to the image forming apparatus 100 will be described. In the block diagram illustrated in FIG. 2, the image data received by the printer controller 103 through the external I/F 308 is input to an input color space converter 307. The image data is often rendered by standard printing CMYK signal values such as RGB values and Japan Color in normal color printing. In this case, the input color space converter 307 of the CMM 306 performs the color conversion of RGB to L*a*b* or CMYK to L*a*b by referring to the input ICC profile, and converts the input image data into the L*a*b* data. The input ICC profile is composed of one dimensional LUT controlling gamma of an input signal, a multi-dimensional color LUT called as a direct mapping and one dimensional LUT controlling gamma of generated conversion data.

The CMM 306 corrects the L*a*b* data as necessary to adjust color of a printed product. An example of the correction process includes GAMUT conversion correcting a mismatch between a color range of an input device and a color range reproducible by the image forming apparatus 100. Another example includes a case of a color conversion of adjusting a mismatch between a type of light source for input and a type of light source in observing the printing product of the image forming apparatus 100 (referred to also as a mismatch in setting color temperature). A still other example includes a case of discrimination of black characters for discriminating character parts within a color image to convert to a color suitable as a color of characters in order to enhance readability of the characters in a printed product. The L*a*b* data is converted by these correcting processes into L*'a*'b*' data. Further, the CMM 306 converts into the L*'a*'b*' data by conducting the correcting process as necessary also in a case where input image data input through the external I/F 308 is rendered by the L*a*b* color space.

An output color space converter 305 converts the L*'a*'b*' data received from the CMM 306 into the CMYK signal by conducting the color conversion of L*a*b* to CMYK based on the output ICC profile. In a case where the output ICC profile is updated by the profile creating portion 301 at this time, the CMYK signal generated in a condition before the update differs from the CMYK signal generated in a condition after the update even if the L*a*b* data is the same. That is, the output ICC profile as an image forming condition of the image forming apparatus 100 is changed in accordance with the measurement results of the color sensor 200 serving as the measurement unit of this embodiment. To be noted, while, in FIG. 2, the input color space converter 307 and the output color space converter 305 are indicated as portions distinguished from the CMM 306, as shown in FIG. 5, the CMM indicates a whole of a module which conducts the color management by performing the color conversion referring to the input and output color profiles.

Colorimetric Unit

Figure 6A:
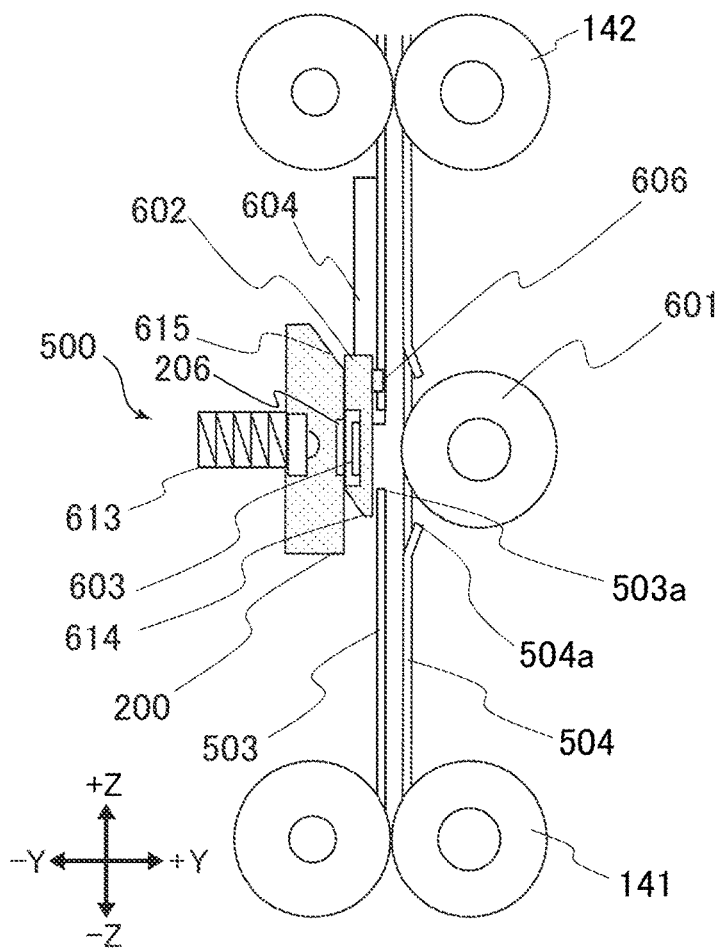
FIG. 6A is a cross-sectional view of a colorimetric unit (calibration position) pertinent to the first embodiment.
Figure 7A:
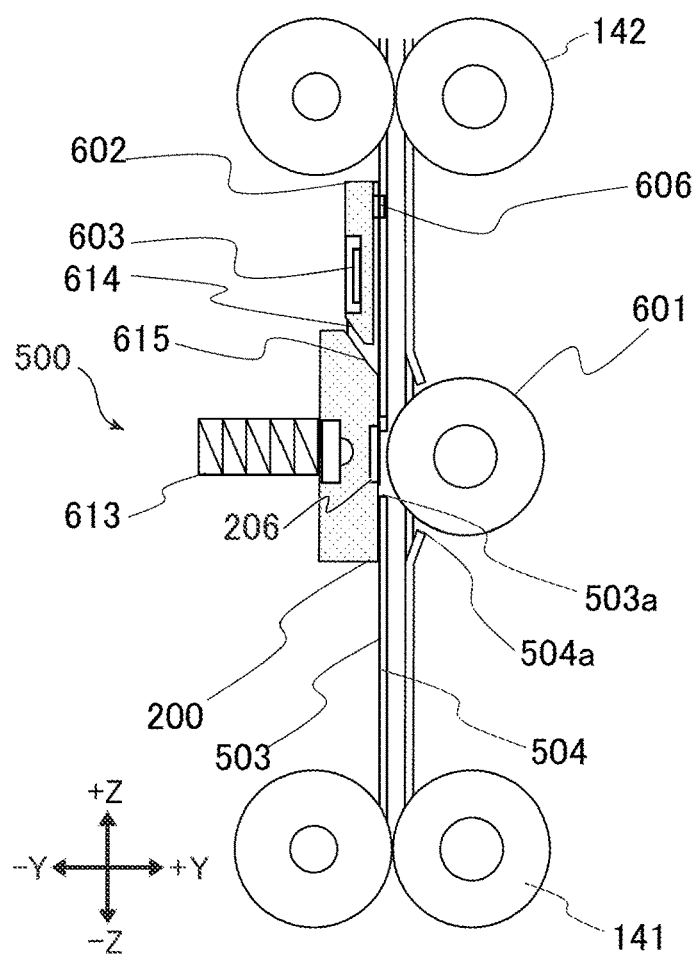
FIG. 7A is a cross-sectional view of the colorimetric unit (measurement position) pertinent to the first embodiment.

Next, a colorimetric unit 500 will be described. FIGS. 6A and 7A show the cross-sectional view of the colorimetric unit 500. To be noted, in FIG. 6A and the following figures, a sheet conveyance direction in the colorimetric unit 500 is referred to as a Z direction, and a sheet width direction (main scanning direction) perpendicular to the Z direction is referred to as an X direction, and a sheet thickness direction perpendicular to the Z and X directions is indicated by a Y direction. In a case where one side and the other side in the respective directions are distinguished similarly to a drawing sheet, they are indicated by putting a mark of "+" or "−". Further, the Y direction is also a direction of the depth of a field of the color sensor 200.

As shown in FIG. 6A, the colorimetric unit 500 is disposed on a conveyance path (a part of the third conveyance path 135, see also FIG. 1) extending in a +Z direction from a first roller pair 141 toward a second roller pair 142. The conveyance path in the colorimetric unit 500 is a conveyance space formed by a first conveyance guide 503 facing a surface of a measurement object sheet (hereinafter referred to as a sample sheet) and a second conveyance guide 504 facing a back surface of the sample sheet.

The colorimetric unit 500 includes the color sensor 200, a calibration member 602, and an opposing roller 601. The configuration of the color sensor 200 has been described with FIG. 3. The color sensor 200 is disposed movably in a first direction (the Y direction in this embodiment) which is a direction approaching and moving away from an opening portion 503a of the first conveyance guide 503. The color sensor 200 is disposed so as to face the opposing roller 601 in the Y direction, and includes the lens 206 (see FIG. 3) for admitting light from the sample sheet on a side surface of the color sensor 200 in a +Y direction. Further, an urging spring 613, serving as an urging member or pressing member, comes into contact with a side surface in a −Y direction, and the color sensor 200 is urged in the +Y direction by the urging spring 613.

In this embodiment, a plurality (4 pieces in the illustrated example) of color sensors 200 having substantially the same configuration are disposed in line at equal intervals in the X direction. Therefore, in the colorimetric unit 500, it is possible to measure 4 rows of patch images on the sample sheet in parallel.

When viewed in the Y direction, the opening portion 503a of the first conveyance guide 503 is disposed at a position overlapping with the lens 206 of each color sensor 200. When the color sensor 200 is at a measurement position (see FIG. 7A), described below, the color sensor 200 irradiates the sample sheet with light through the opening portion 503a of the first conveyance guide 503, and admits the light from the sample sheet.

Figure 6B:
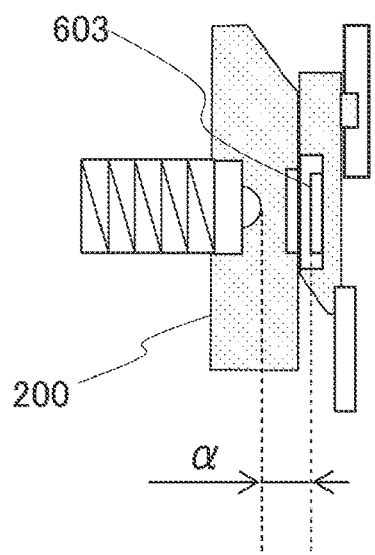
FIG. 6B is an enlarged view enlarging a part of the cross-sectional view.
Figure 6C:
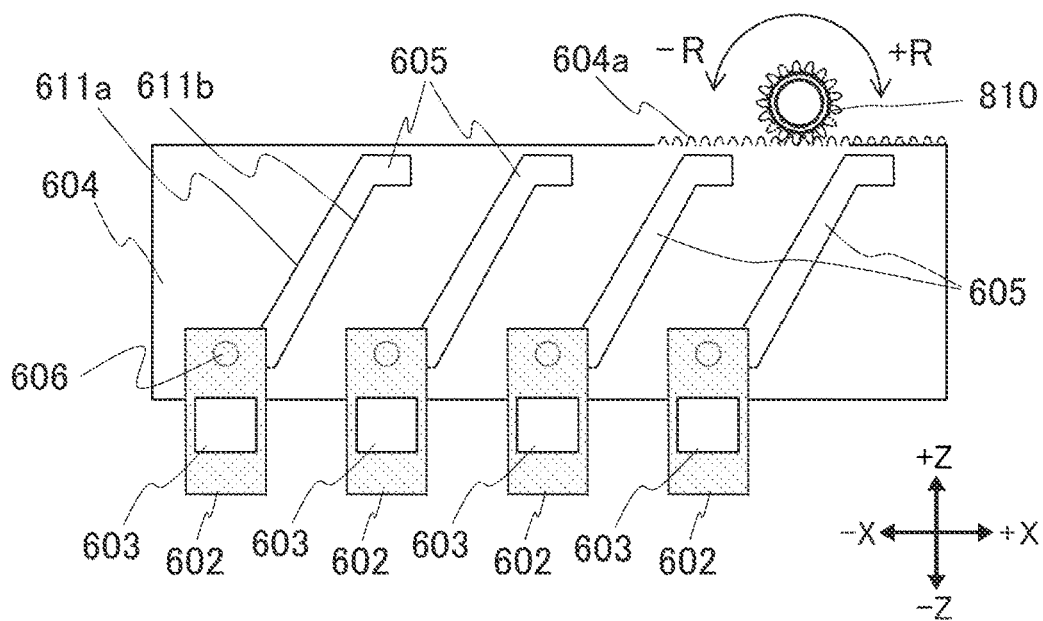
FIG. 6C is a schematic view showing a calibration member and a movement mechanism thereof.

The calibration member 602 includes the white reference portion 603 serving as a reference of the measurement data of the color sensor 200, and is disposed on an opposite side of the conveyance path with respect to the first conveyance guide 503 in terms of the Y direction. That is, the calibration member 602 is disposed on the same side (side in −Y direction) as the color sensor 200 with respect to the conveyance path. The calibration member 602 is movable in a second direction (Z direction in this embodiment) intersecting with the Y direction that is a moving direction of the color sensor 200. As shown in FIG. 6C, a plurality (4 pieces in the illustrated example) of calibration members 602, each serving as a moving member in this embodiment, are disposed correspondingly to the plurality of color sensors 200, and move in conjunction with each other. The movement of the calibration member 602 will be described below.

The opposing roller 601 is disposed on an opposite side (side in +Y direction with respect to conveyance path) of the color sensor 200 across the conveyance path. The opposing roller 601 is a roller member rotating around an axis extending in the X direction as a center, and is exposed to the conveyance path through an opening portion 504a provided in the second conveyance guide 504. Further, the opposing roller 601 is movable in the Y direction by a movement mechanism, not shown, so as to approach or move away from the color sensor 200. The opposing roller 601 is an example of an opposing member or opposing member, and it is acceptable to be, for example, a plate-shaped guide member.

A cylindrical roller having a length covering the whole length of the measuring positions of 4 color sensors 200 in terms of the X direction is utilized as the opposing roller 601 of this embodiment. In this embodiment, since the calibration members 602 are disposed on the same side as the color sensors 200 with respect to the conveyance path, if the opposing roller 601 is disposed in the same position as each of the color sensors 200 in terms of the X direction, the opposing roller 601 does not interfere with the calibration members 602. Further, since the opposing roller 601 is disposed in the same position as the color sensors 200 in terms of the X direction, it is possible to position the sample sheet more accurately in terms of the Y direction in comparison with a case where a position of the opposing roller 601 in terms of the X direction is different from the color sensors 200. To be noted, it is acceptable to dispose the opposing roller 601 such that the opposing roller 601 is divided into a plurality of roller members corresponding to each of the color sensors 200.

Positions of Color Sensor and Calibration Member

Figure 7B:
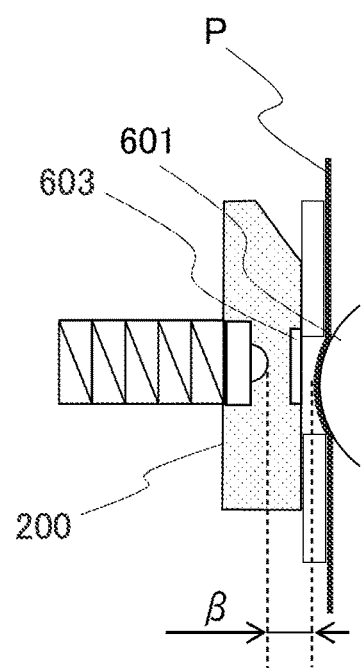
FIG. 7B is an enlarged view enlarging a part of the cross-sectional view.
Figure 7C:
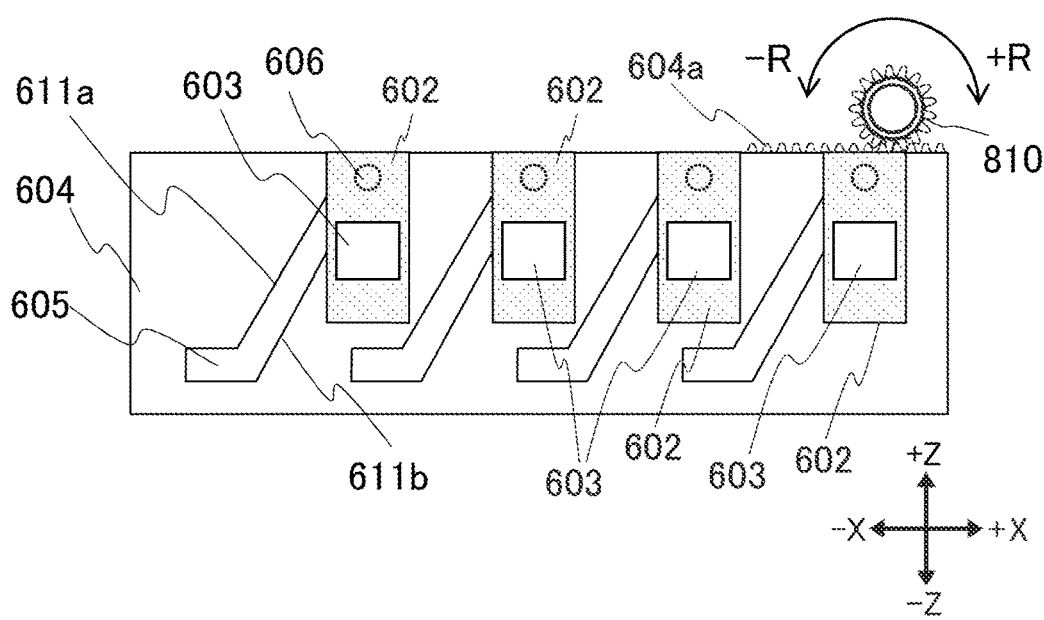
FIG. 7C is a schematic view showing the calibration member and the movement mechanism thereof.

Next, using FIGS. 6A to 6C and FIGS. 7A to 7C, positions which the calibration member 602 and the color sensor 200 are takable will be described. FIGS. 6A and 7A are the cross-sectional view of the colorimetric unit 500 taken along a plane perpendicular to the X direction (i.e., a plane passing through a pair of the color sensor 200 and the white reference portion 603). FIGS. 6B and 7B are the enlarged view enlarging parts of FIGS. 6A and 7A. FIGS. 6C and 7C are the view in which the calibration member 602 and its movement mechanism are viewed from the side in the −Y direction.

Hereinafter, a positional relationship of each member in a calibration position and a measurement position will be described, and, thereafter, the movement mechanism and a positional switch of the calibration member 602 will be described. In this embodiment, the color sensor 200 is movable to the measurement position (i.e., a first position of this embodiment) where the measurement of the sample sheet is performed, and to the calibration position (i.e., waiting position or a second position of this embodiment) where the measurement of the sample sheet is not performed. Further, the calibration member 602 is movable to a facing position (i.e., a fourth position of this embodiment) where the white reference portion 603 faces the color sensor 200, and to a retracting position (i.e., a third position of this embodiment) where the white reference portion 603 has retracted so as not to face the color sensor 200.

FIGS. 6A to 6C show a state (i.e., second state) where the color sensor 200 is in the calibration position and the calibration member 602 is in the facing position. Since the second state is a state where it is possible to calibrate the color sensor 200 with the white reference portion 603, a disposition in the second state can be called as the calibration position of the color sensor 200 and the calibration member 602. The calibration position is also the waiting position taken in a case where neither of the measurement of the sample sheet nor the calibration of the color sensor 200 is not performed in the colorimetric unit 500. FIGS. 7A to 7C show a state (i.e., first state) where the color sensor 200 is in the measurement position and the calibration member 602 is in the retracting position. Since the first state is a state where it is possible to measure the sample sheet P with the color sensor 200, a disposition of the first state can be called as the measurement position of the color sensor 200 and the calibration member 602.

In the calibration position shown in FIG. 6A, a side surface of the color sensor 200 on a side in the +Y direction comes into contact with a side surface of the calibration member 602 on a side in the −Y direction. The color sensor 200 is movable in the Y direction between the measurement position and the calibration position, and urged toward the measurement position by the urging spring 613. Therefore, the color sensor 200 is positioned by coming into contact with the calibration member 602 positioned in the facing position.

In the calibration position, the calibration member 602 is positioned between the color sensor 200 and the first conveyance guide 503 in terms of the Y direction, and the white reference portion 603 faces the lens 206 of the color sensor 200. Further, a surface of the white reference portion 603 is, in terms of the Y direction, positioned at an in-focus position α of the color sensor 200 positioned in the calibration position (see FIG. 6B). Therefore, it is possible to calibrate the color sensor 200 with the color sensor 200 focusing on the white reference portion 603. To be noted, if the surface of the white reference portion 603 is positioned within 1 mm (preferably within 0.3 mm) with respect to the precise in-focus position α, it is possible to expect that the calibration is performed with practical precision. Including the case mentioned above, it is suitable if the surface of the white reference portion 603 in the calibration position is positioned in the in-focus position of the color sensor 200.

Further, in the calibration position, objective surfaces of the white reference portion 603 and the lens 206 are positioned inside a space surrounded by other portions of the calibration member 602 and the casing of the color sensor 200 (or a holder holding the color sensor 200). At this time, the white reference portion 603 is covered by the color sensor 200 when viewed from the side in the −Y direction, and the lens 206 of the color sensor 200 is covered by the calibration member 602 when viewed from the side in the +Y direction. Therefore, the color sensor 200 serves as a shutter member protecting the white reference portion 603 from a foreign substance, and also the calibration member 602 serves as a shutter member protecting the lens 206 from a foreign substance. Preferably, a whole of the white reference portion 603 is covered by the color sensor 200 when viewed from the side in the −Y direction, and a whole of the lens 206 is covered by the calibration member 602 when viewed from the side in the +Y direction.

In the measurement position shown in FIG. 7A, the calibration member 602 retracts from a position between the color sensor 200 and the first conveyance guide 503 in terms of the Y direction. In this embodiment, the calibration member 602 moves from the facing position to the retracting position by moving to an upper side in a direction (+Z direction) approximately parallel to the sheet conveyance direction. Further, the side surface of the color sensor 200 on the side in the +Y direction comes into contact with the first conveyance guide 503, so that the color sensor 200 is positioned in the measurement position. The lens 206 of the color sensor 200, which positioned in the measurement position, faces the opening portion 503a in the first conveyance guide 503.

The positional relationship between the color sensor 200 and the opposing roller 601 in the measurement position is set such that a surface of the sample sheet P, whose back surface is guided by the opposing roller 601, passes through an in-focus position β of the color sensor 200 positioned in the measurement position (see FIG. 7B). Therefore, it becomes possible to perform the measurement of the patch image with the color sensor 200 focusing on the surface of the sample sheet P. A distance from the color sensor 200 in the calibration position to the in-focus position α is substantially the same as a distance from the color sensor 200 in the measurement position to the in-focus position β except for manufacturing tolerance and the like. To be noted, if the surface of the opposing roller 601 is positioned within 1 mm (preferably within 0.3 mm) with respect to the in-focus position β, it is possible to expect that the calibration is performed with practical precision. Including the case mentioned above, it is suitable if the surface of the opposing roller 601 in the measurement position is positioned in the in-focus position of the color sensor 200. A distance from the color sensor 200 in the calibration position to the white reference portion 603 is assumed to be substantially the same as a distance from the color sensor 200 in the measurement position to the opposing roller 601, while the same extent of errors as α and β being allowed.

To be noted, in this embodiment, also the opposing roller 601 is configured to move in line with a positional switch operation of the colorimetric unit 500 between the calibration and measurement positions. When the colorimetric unit 500 is in the calibration position (see FIG. 6A), the opposing roller 601 is held in a far position away from the first conveyance guide 503 so as to avoid wear. When the colorimetric unit 500 is in the measurement position (see FIG. 7A), the opposing roller 601 is held in a near position moved to the side in the −Y direction toward the color sensor 200.

In particular, in this embodiment, in the measurement position, a part of an outer circumferential portion of the opposing roller 601 on the side in the −Y direction is positioned in a position protruded into the opening portion 503a of the first conveyance guide 503. The outer circumferential portion of the opposing roller 601 is formed by an elastic material such as a sponge, and rotates while deforming by rubbing the peripheral edge of the opening portion 503a. Therefore, by pressed in the −Y direction toward the color sensor 200 by the opposing roller 601 in the measurement position of the color sensor 200, the sample sheet P passes through a space inside the opening portion 503a.

Movement Mechanism of Calibration Member

A movement mechanism for moving the calibration member 602 between the facing position (see FIG. 6A) and the retracting position (see FIG. 7A) will be described. As shown in FIGS. 6C and 7C, each of the calibration members 602 is supported by a slide rail 604 which is a slide member slidable in +X and −X directions along the X direction that is a third direction. The slide rail 604 includes a rail hole 605 incorporating inclined surfaces 611a and 611b. The inclined surfaces 611a and 611b each incline in the Z direction, which is the moving direction of the calibration member 602, with respect to a sliding direction in the X direction. Each of the calibration members 602 includes a protrusion 606 engaging with the rail hole 605, and moves in a +Z direction or a −Z direction in conjunction with a slide movement of the slide rail 604.

A rack portion 604A extending in the X direction is disposed on the slide rail 604, and a driving gear 810 driven by a position switching motor M1 (see FIG. 2), serving as a driving source, engages with the rack portion 604A. When the driving gear 810 is driven by the position switching motor M1 in a +R direction, the slide rail 604 slides in the −X direction, and when the driving gear 810 is driven in a −R direction, the slide rail 604 slides in the +X direction.

Switch of Positions

Figure 8A:
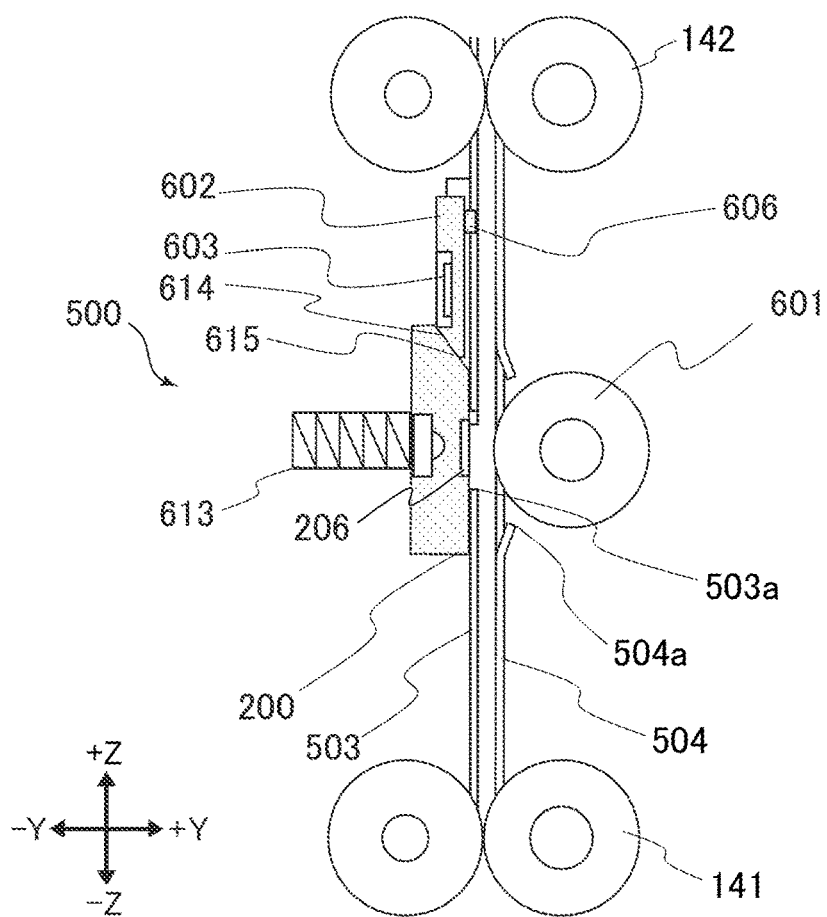
FIG. 8A is a cross-sectional view of the colorimetric unit (in positional transition) pertinent to the first embodiment.
Figure 8B:
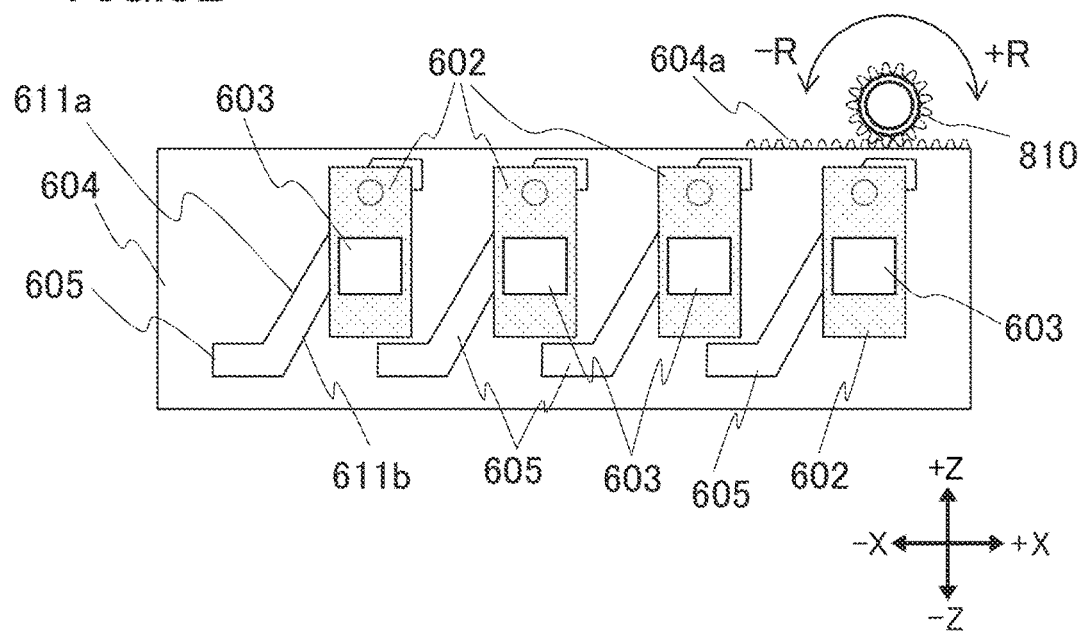
FIG. 8B is a schematic view showing the calibration member and the movement mechanism thereof.
Figure 9A:
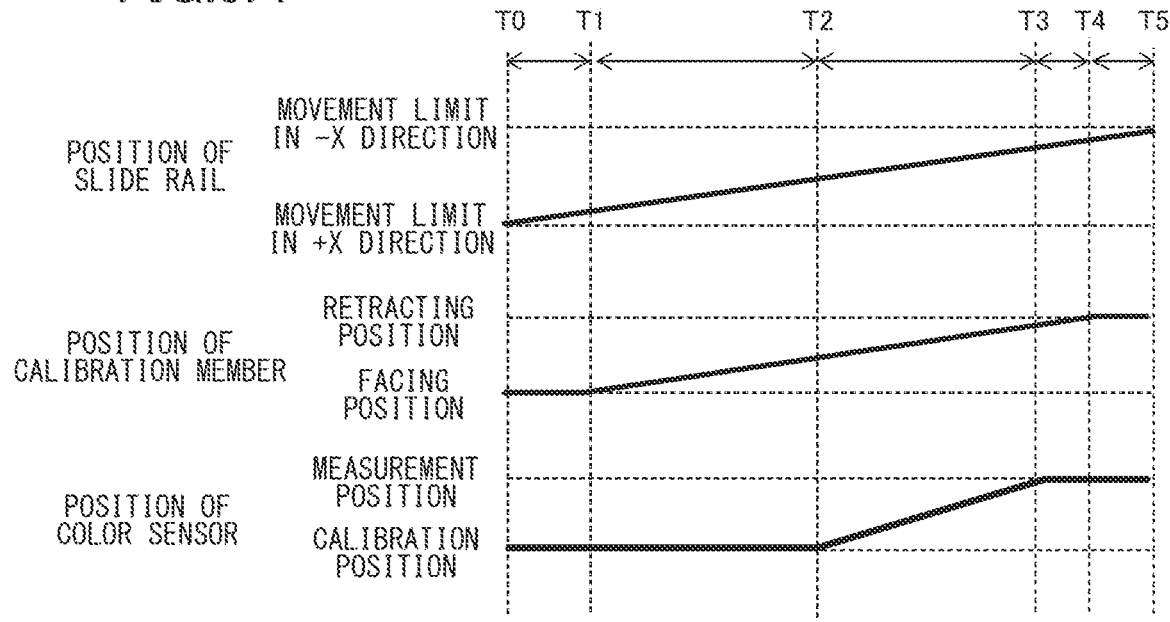
FIG. 9A is a timing chart showing positional transition of the colorimetric unit pertinent to the first embodiment.

Hereinafter, using FIGS. 6 to 9, the positional switch operation of the colorimetric unit 500 will be described. FIG. 8A is the cross-sectional view of the colorimetric unit 500 during a positional switch. FIG. 8B is a diagram, viewed from the side in the −Y direction, showing the calibration member 602 and its movement mechanism in the positional switch. FIG. 9 is a timing chart of the positional switch operation, and FIGS. 9B to 9D are schematic diagrams showing the positional relationships between the color sensor 200 and the calibration member 602 at the respective times in the timing chart.

In this embodiment, the color sensor 200 and the calibration member 602 are moved by the driving force of the position switching motor M1, which is a common actuator, and the colorimetric unit 500 switches a position between the calibration position and the measurement position. As shown in FIG. 6A, the calibration member 602 includes an inclined surface 614 inclining in the −Y direction, in which the color sensor 200 moves from the measurement position to the calibration position when the calibration member 602 moves, toward the −Z direction from the retracting position to the facing position. The inclined surface 614 is disposed at the edge of the calibration member 602 on the sides in the −Y direction and the −Z direction. Further, also an inclined surface 615 inclining in the −Y direction with respect to the −Z direction is provided to the color sensor 200. The inclined surface 615 is provided at the edge of the color sensor 200 on the sides in the +Y direction and the +Z direction.

The inclined surfaces 614 and 615 are mechanisms by which the calibration member 602 and the color sensor 200 come into contact with each other when the calibration member 602 moves from the retracting position toward the facing position, so that the color sensor 200 is moved from the measurement position to the calibration position by the driving force of the position switching motor M1. To be noted, the inclined surfaces 614 and 615 serve as contact portions, and even if a shape of either one of the inclined surface 614 of the calibration member 602 and the inclined surface 615 of the color sensor 200 is changed to other than the inclined surface (for example, corner), similar movement is realized.

Figure 9B:
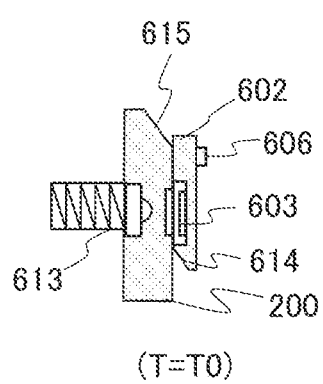
FIGS. 9B to 9D are schematic views showing the positional transition of the colorimetric unit.
Figure 9C:
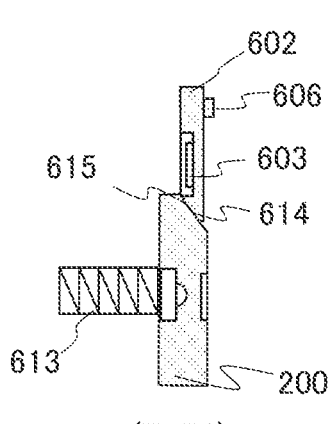
Figure 9D:
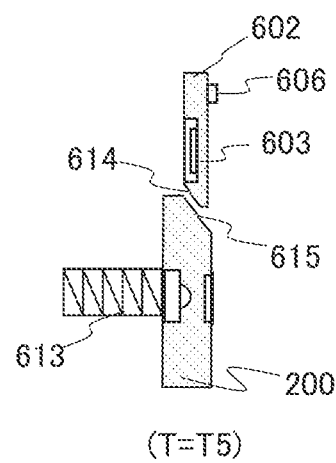

As shown in FIGS. 6A, 6B, and 9B, in a case where the colorimetric unit 500 is positioned in the calibration position, the calibration member 602 and the color sensor 200 come into contact with each other on the side surfaces in the Y direction, and the inclined surfaces 614 and 615 do not come into contact with each other.

In a case where the colorimetric unit 500 is switched over from the calibration position to the measurement position, the position switching motor M1 rotatably drives the driving gear 810 in the +R direction. Then, the slide rail 604 starts sliding in the −X direction (TIME T0 in FIG. 9A). Thereafter, the protrusion 606 of the calibration member 602 is guided to the inclined surface 611b of the rail hole 605, so that the calibration member 602 starts moving in the +Z direction (TIME T1 in FIG. 9A).

When the driving gear 810 further rotates in the +R direction, the calibration member 602 reaches a position where the inclined surface 614 of the calibration member 602 faces the inclined surface 615 of the color sensor 200. With the movement of the calibration member 602 further in the +Z direction, while sliding the inclined surfaces 614 and 615, the color sensor 200 starts moving in the +Y direction from the calibration position to the measurement position by the urging force of the urging spring 613 (TIME T2 in FIG. 9A). Then, when the color sensor 200 abuts on the first conveyance guide 503, the color sensor 200 is positioned in the measurement position (FIGS. 8A and 8B, and TIME T3 in FIG. 9A).

When the driving gear 810 further rotates in the +R direction, the protrusion 606 of the calibration member 602 goes through the inclined surface 611b of the rail hole 605, and the calibration member 602 is positioned in the retracting position (FIG. 7A, TIME T4 in FIG. 9A). In the retracting position, the inclined surface 614 of the calibration member 602 does not come into contact with the inclined surface 615 of the color sensor 200. Thereafter, the driving gear 810 stops rotation, so that the switch operation of the colorimetric unit 500 from the calibration position to the measurement position ends (TIME T5 in FIG. 9A).

In a case where the colorimetric unit 500 is switched over from the measurement position to the calibration position, each part operates in a manner following the above processes reversely.

That is, the position switching motor M1 rotatably drives the driving gear 810 in the −R direction. Then, the slide rail 604 starts sliding in the +X direction. Thereafter, the protrusion 606 of the calibration member 602 is guided to the inclined surface 611a of the rail hole 605, so that the calibration member 602 starts moving in the −Z direction.

When the driving gear 810 further rotates in the −R direction, the inclined surface 614 of the calibration member 602 comes into contact with the inclined surface 615 of the color sensor 200. With the movement of the calibration member 602 further in the −Z direction, while sliding the inclined surfaces 614 and 615, the color sensor 200 starts moving in the −Y direction from the measurement position to the calibration position against the urging force of the urging spring 613. Then, when the inclined surface 615 of the color sensor 200 climbs to the top of the inclined surface 614 of the calibration member 602 and, consequently, the side surfaces in the Y direction of the color sensor 200 and the calibration member 602 come into contact with each other, the color sensor 200 is positioned in the calibration position. To be noted, since, in this embodiment, the moving direction of the calibration member 602 from the retracting position toward the facing position is downward in the approximately vertical direction, a part of a load to move the color sensor 200 is canceled out by the own weight of the calibration member 602.

When the driving gear 810 further rotates in the −R direction, the protrusion 606 of the calibration member 602 goes through the inclined surface 611a of the rail hole 605, and the calibration member 602 is positioned in the facing position (see FIGS. 6A to 6C). Thereafter, the driving gear 810 stops rotation, so that the switch operation of the colorimetric unit 500 from the measurement position to the calibration position ends.

Colorimetric Sequence

Figure 10:
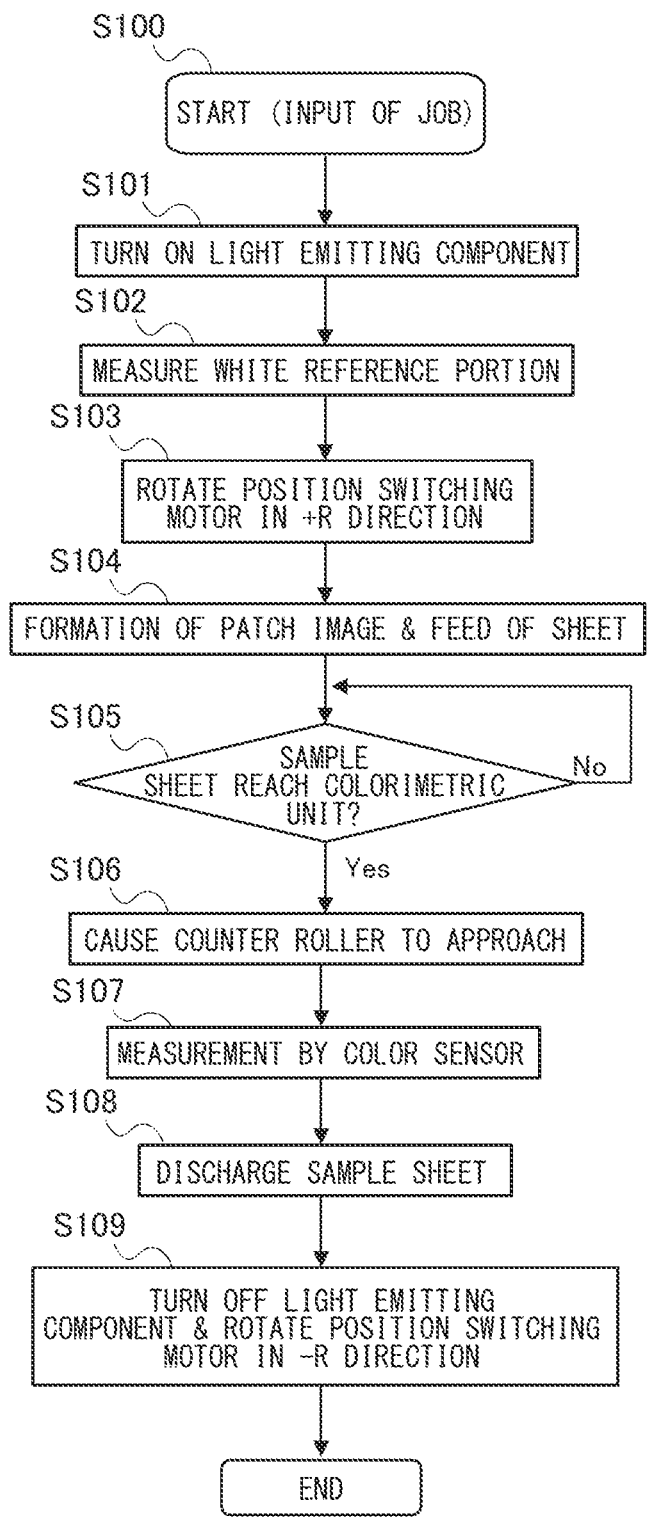
FIG. 10 is a flowchart showing a control example of the image forming apparatus pertinent to the first embodiment.

Next, a flow of processes which are performed in a case where an instruction of an operation to perform color adjustment by forming the test image on the sheet and measuring by the colorimetric unit 500 (hereinafter referred to as a colorimetric job) is input will be described along the flowchart shown in FIG. 10. The term "color adjustment" indicates modification of the output ICC profile, a change of table values used by the color processing portion 315 and the gradation correction portion 316, and the like. For instance, a look up table (γLUT) used by the gradation correction portion 316 and a setting value of a developing contrast Vcont (difference between developing voltage and light potential) at a developing step are changed.

The CPU of the printer controller 103 (see FIG. 2) reads and executes programs, so that each step of the flowchart described below is realized. Further, an execution timing of the colorimetric job includes a case where the user explicitly instructs an execution through the operation part 180 (see FIG. 1), and a case where the printer controller 103 judges the execution before a start of a job to obtain the printed product or at fixed intervals during the execution of the job.

At a start of the colorimetric job, the colorimetric unit 500 is in the calibration position (STEP S100). That is, the lens 206 of the color sensor 200 is covered by the calibration member 602 having a role of the shutter, and also the white reference portion 603 of the calibration member 602 is covered by the color sensor 200. After the start of the colorimetric job, the light emitting component 201 of the color sensor 200 is turned on so as to conduct a calibration of the color sensor 200 (STEP S101), and the white reference portion 603 is read by the color sensor 200 (STEP S102).

Thereafter, an instruction for rotatably driving the driving gear 810 in the +R direction is output to the position switching motor M1 through the engine control unit 312 (STEP S103). Thereby, the switch operation of the colorimetric unit 500 from the calibration position to the measurement position is performed. That is, the slide rail 604 moves in the −X direction, and the calibration member 602 moves in the +Z direction from the facing position toward the retracting position. Further, in conjunction with the movement of the calibration member 602 in the +Z direction, the color sensor 200 moves in the +Y direction from the calibration position toward the measurement position.

Further, with an output of the instruction to the image forming engine 102 for starting forming the test image used for the colorimetric measurement, the sheet 1 serving as the sample sheet is fed from the storage cabinet 113 (STEP S104). When it is judged that the sample sheet on which the test image was formed has been reached the colorimetric unit 500 (STEP S105: Yes), the opposing roller 601 moves from the far position to the near position, so that the color measurement by the color sensor 200 is performed (STEP S107). In this embodiment, so-called "document feeding reading" is performed so that the color sensor 200 reads the image while continuing to convey the sample sheet.

Here, a spectral reflectance of the white reference portion 603 detected by the color sensor 200 at STEP S102 is treated as W(λ), and a spectral reflectance detected by the color sensor 200 at STEP S107 is treated as P(λ). In the above, λ indicates a wavelength corresponding to any one of the image sensors of the line sensor 203 (see FIG. 3) (or a wavelength where a spectral reflectance is calculated by the interpolation calculation method). At this time, a spectral reflectance R(λ) of the patch image constituting the test image is obtained as R(λ)=P(λ)/W(λ). Thus, spectral reflectance data of the patch image which have been calibrated with a measurement result of the white reference portion 603 are notified to the printer controller 103 as a colorimetric result (see FIG. 2) of the color sensor 200. As described above, the creation of the output ICC profile and the like are performed in the printer controller 103 based on the colorimetric result of the color sensor 200.

The sample sheet whose measurement has been performed is discharged to the outside of the image forming apparatus 100 (STEP S108). Then, the light emitting component 201 is turned off, and the instruction for rotatably driving the driving gear 810 in the −R direction is output to the position switching motor M1 through the engine control unit 312 (see FIG. 2), so that the switch operation of the colorimetric unit 500 from the measurement position to the calibration position is performed (STEP S109). That is, the slide rail 604 moves in the +X direction, and the calibration member 602 moves in the −Z direction from the retracting position toward the facing position. Further, in conjunction with the movement of the calibration member 602 in the −Z direction, the color sensor 200 moves in the −Y direction from the measuring position toward the calibration position. With that, the colorimetric job ends.

To be noted, while the operations in a case where the colorimetric job is instructed to the image forming apparatus 100 are described here, in a case where a job to obtain the printed product (i.e., print job) is instructed to the image forming apparatus 100, the colorimetric unit 500 is maintained in the calibration position during the execution of the print job.

As described above, in this embodiment, the color sensor 200 and the calibration member 602 are movably constructed, and, in the calibration position, serve as the shutter members covering each other. Thereby, it is possible to reduce the adhesion of a foreign substance to the white reference portion 603 and the lens 206 of the color sensor 200. Further, in comparison with a configuration in which a dedicated shutter member is disposed to each of the lens 206 of the color sensor 200 and the white reference portion 603, it is possible to reduce a number of shutter members, and possible to realize the miniaturization of the apparatus.

Other Embodiments

While, in this embodiment, the color sensor 200 and the calibration member 602 are driven by a single driving source (actuator), it is acceptable to drive each of the color sensor 200 and the calibration member 602 by an individual driving source (actuator).

Further, in this embodiment, the moving direction of the calibration member 602 is the approximately vertical direction and is downward in the vertical direction when the calibration member 602 moves from the retracting position toward the facing position. While this configuration is advantageous since the load of the position switching motor M1 is reduced thereby and it is therefore possible to use a smaller motor, it is acceptable that the moving direction of the calibration member 602 is other than the vertical direction. For instance, it is acceptable that the moving direction of the calibration member 602 is a horizontal direction (X direction) intersecting with the moving direction of the color sensor 200. In such a case, it is conceivable that a reduction mechanism with a relatively large reduction ratio is disposed between the position switching motor M1 and the driving gear 810 so as to secure the driving force of the calibration member 602.

Further, while, in this embodiment, the color sensor 200 of a spectrophotometer is used as the measurement unit, it is acceptable to use an image sensor of a charge-coupled device (CCD) system or a contact image sensor (CIS) system, both of which read the image information from the sheet of a measuring object, as the measurement unit.

Further, while, in this embodiment, the opening portion 503A is a through hole provided in the first conveyance guide 503, it is acceptable that, for instance, the first conveyance guide 503 is constructed by a plurality of members and the opening portion 503A is formed by a gap between the plurality of members.

Further, while, in this embodiment, the colorimetric unit 500 is described as being incorporated inside the image forming apparatus 100 (in the same casing as the casing in which the image forming engine is housed), it is acceptable to mount the colorimetric unit 500 in a measurement apparatus different from the image forming apparatus 100. In such a case, an image forming system is constructed by coupling the measurement apparatus including the colorimetric unit 500 to the image forming apparatus 100, and the measurement apparatus measures the sheet received from the image forming apparatus 100, and notify the measurement result to the image forming apparatus 100. The image forming apparatus 100 performs the creation of the output ICC profile and the like based on the measurement result received from the measurement apparatus.

According to the present disclosure, it is possible to reduce the degradation of measurement accuracy due to the adhesion of a foreign substance with a compact configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-036277, filed on Mar. 8, 2021, which is hereby incorporated by reference herein in its entirety.

What is claimed is:

1. An image forming apparatus comprising:
   an image forming unit configured to form an image on a sheet;
   a conveyance guide configured to guide the sheet on which the image has been formed by the image forming unit, the conveyance guide having an opening portion;
   a measurement unit configured to measure the image on the sheet conveyed through a conveyance path formed by the conveyance guide, the measurement unit including a light entrance portion through which light from a measurement object enters the measurement unit; and
   a moving member movable with respect to the measurement unit and disposed on a same side as the measurement unit with respect to the conveyance path, the moving member including a reference portion configured to be measured by the measurement unit,
   wherein the measurement unit is movable to a first position and a second position along a first direction approaching and moving away from the opening portion, the first position being a position where the measurement unit faces the opening portion in the conveyance guide, the second position being a position away from the opening portion in comparison with the first position,
   wherein the moving member is movable to a third position and a fourth position along a second direction intersecting with the first direction, the third position being a position where the reference portion does not face the light entrance portion, the fourth position being a position where the reference portion faces the light entrance portion,
   wherein the measurement unit is configured to measure the image on the sheet through the opening portion in a first state where the measurement unit is positioned in the first position and the moving member is positioned in the third position, and
   wherein the measurement unit is configured to measure the reference portion in a second state where the measurement unit is positioned in the second position and the moving member is positioned in the fourth position.

2. The image forming apparatus according to claim 1, wherein the moving member is positioned between the measurement unit and the conveyance guide in the second state.

3. The image forming apparatus according to claim 2, wherein, in the second state, a whole of the reference portion is covered with the measurement unit and a whole of the light entrance portion is covered by the moving member when viewed in the first direction.

4. The image forming apparatus according to claim 2, wherein, in the second state, the opening portion is covered with the moving member when viewed in the first direction.

5. The image forming apparatus according to claim 1, wherein, in the second state, the reference portion is positioned in an in-focus position of the measurement unit.

6. The image forming apparatus according to claim 1, further comprising an opposing member disposed on an opposite side from the measurement unit with respect to the conveyance path,
   wherein a distance in the first direction from the light entrance portion to the opposing member in the second state is larger than a distance in the first direction from the light entrance portion to the opposing member in the first state.

7. The image forming apparatus according to claim 6, wherein the opposing member is disposed at a same position as the light entrance portion in a sheet width direction perpendicular to a sheet conveyance direction of the sheet.

8. The image forming apparatus according to claim 1, wherein the measurement unit is configured to move from the first position to the second position in conjunction with a movement of the moving member from the third position to the fourth position.

9. The image forming apparatus according to claim 1, further comprising a driving source configured to move the moving member to the third position and the fourth position,
   wherein the measurement unit is configured to be moved, by receiving force of the driving source via the moving member, from the first position to the second position in conjunction with a movement of the moving member from the third position to the fourth position.

10. The image forming apparatus according to claim 9, further comprising an urging member configured to urge the measurement unit toward the opening portion in the first direction,
    wherein the moving member includes a contact portion configured to, in a case where the moving member moves from the third position to the fourth position, come into contact with the measurement unit so as to move the measurement unit from the first position to the second position against an urging force of the urging member.

11. The image forming apparatus according to claim 10, wherein the contact portion includes an inclined surface inclining in a direction in which the measurement unit moves from the second position to the first position toward a direction in which the moving member moves from the third position to the fourth position.

12. The image forming apparatus according to claim 9, wherein the image forming apparatus is provided with a plurality of measurement units including the measurement unit, and wherein the image forming apparatus is provided with a plurality of moving members that include the moving member and that are arranged correspondingly to the plurality of measurement units, and wherein the image forming apparatus further comprises a slide member configured to move the plurality of moving members by being moved in a third direction by a driving force of the driving source, the third direction intersecting with both the first direction and the second direction.

13. The image forming apparatus according to claim 1, wherein, in a case where the image forming apparatus executes a job to form a test image for a measurement on the sheet and to perform measurement by the measurement unit, the image forming apparatus is configured to cause the measurement unit to measure the reference portion in the second state, cause the measurement unit to measure the test image after a transition from the second state to the first state is completed, and cause a transition from the first state to the second state before an end of the job.

14. The image forming apparatus according to claim 1, wherein the first direction is a direction perpendicular to a sheet conveyance direction of the sheet and perpendicular to a sheet width direction perpendicular to the sheet conveyance direction, and wherein the second direction is a direction parallel to the sheet conveyance direction.

15. The image forming apparatus according to claim 1, further comprising a control unit configured to adjust an image forming condition of the image forming unit based on a measurement result of the measurement unit.

16. A measurement apparatus for measuring an image on a sheet, the measurement apparatus comprising:

a conveyance guide configured to guide the sheet on which the image has been formed by an image forming unit, the conveyance guide having an opening portion;

a measurement unit configured to measure the image on the sheet conveyed through a conveyance path formed by the conveyance guide, the measurement unit including a light entrance portion through which light from a measurement object enters the measurement unit; and a moving member movable with respect to the measurement unit and disposed on a same side as the measurement unit with respect to the conveyance path, the moving member including a reference portion configured to be measured by the measurement unit, wherein the measurement unit is movable to a first position and a second position along a first direction approaching and moving away from the opening portion, the first position being a position where the measurement unit faces the opening portion in the conveyance guide, the second position being a position away from the opening portion in comparison with the first position, wherein the moving member is movable to a third position and a fourth position along a second direction intersecting with the first direction, the third position being a position where the reference portion does not face the light entrance portion, the fourth position being a position where the reference portion faces the light entrance portion, wherein the measurement unit is configured to measure the image on the sheet through the opening portion in a first state where the measurement unit is positioned in the first position and the moving member is positioned in the third position, and wherein the measurement unit is configured to measure the reference portion in a second state where the measurement unit is positioned in the second position and the moving member is positioned in the fourth position.

* * * * *